United States Patent
Boire-Lavigne et al.

(10) Patent No.: US 10,417,437 B2
(45) Date of Patent: Sep. 17, 2019

(54) MAINTAINING DATA SECURITY IN A NETWORK DEVICE

(71) Applicant: XMedius Solutions Inc., Montréal (CA)

(72) Inventors: Sébastien Boire-Lavigne, Saint-Laurent (CA); Sébastien Lalonde, St-Lazare (CA); Julien Froment, Terrebonne (CA)

(73) Assignee: XMEDIUS SOLUTIONS INC., Montreal (CA)

( * ) Notice: Subject to any disclaimer, the term of this patent is extended or adjusted under 35 U.S.C. 154(b) by 237 days.

(21) Appl. No.: 15/235,182

(22) Filed: Aug. 12, 2016

(65) Prior Publication Data
US 2017/0091474 A1    Mar. 30, 2017

Related U.S. Application Data (60) Provisional application No. 62/233,771, filed on Sep. 28, 2015.

(51) Int. Cl.
G06F 21/62    (2013.01)
G06F 21/60    (2013.01)
(Continued)

(52) U.S. Cl.
CPC ........ *G06F 21/6218* (2013.01); *G06F 21/602* (2013.01); *G06F 21/606* (2013.01);
(Continued)

(58) Field of Classification Search
None
See application file for complete search history.

(56) References Cited

U.S. PATENT DOCUMENTS 5,623,546 A * 4/1997 Hardy ................ G06F 21/6209
                                                        380/247
7,574,607 B1    8/2009 Liu et al.
(Continued)

FOREIGN PATENT DOCUMENTS

CN    103152362 A    6/2013

OTHER PUBLICATIONS

Roberts, S., "S3 Server Side Encryption with Windows PowerShell," AWS Developer Blog—Windows and .NET, Aug. 11, 2014, Amazon Web Services, Inc., pp. 1-4, accessed May 28, 2015 at http://blogs.aws.amazon.com/net/post/Tx3BT49Q4GC1KV4/S3-Ser ver-Side-Encryption-with-Windows-PowerShell.
(Continued)

*Primary Examiner* — Kaveh Abrishamkar
(74) *Attorney, Agent, or Firm* — Coats & Bennett, PLLC (57) ABSTRACT

A network device for maintaining data security generates different keys corresponding to data received from a sender. The different keys comprise a secret key, a client key, and a server key. The client and server keys form the secret key when combined. The network device encrypts the data with the secret key and discards the secret key in response. The network device generates a Uniform Resource Locator (URL) for requesting the data from the network device. The URL comprises the client key and a randomly-generated data identifier associated with the data. The network device sends the URL to an electronic address of a recipient and discards the client key in response.

29 Claims, 5 Drawing Sheets

(51) Int. Cl.
*H04L 9/08* (2006.01)
*H04L 29/06* (2006.01)
*H04L 29/08* (2006.01)

(52) U.S. Cl.
CPC ............ *H04L 9/085* (2013.01); *H04L 9/0827* (2013.01); *H04L 9/0861* (2013.01); *H04L 9/0891* (2013.01); *H04L 9/0894* (2013.01); *H04L 63/0471* (2013.01); *H04L 63/062* (2013.01); *H04L 63/08* (2013.01); *H04L 67/02* (2013.01); *H04L 67/04* (2013.01); *H04L 67/1097* (2013.01); *H04L 67/42* (2013.01); *H04L 63/0435* (2013.01); *H04L 63/168* (2013.01)

(56) References Cited

U.S. PATENT DOCUMENTS

| | | | |
|---|---|---|---|
| 8,713,325 | B2 | 4/2014 | Ganesan |
| 2007/0086590 | A1* | 4/2007 | Blom ...................... H04L 63/06 380/278 |
| 2010/0095119 | A1* | 4/2010 | Tachibana ............. H04W 12/04 713/168 |
| 2010/0142711 | A1* | 6/2010 | Weis ...................... H04L 9/0833 380/277 |
| 2010/0268934 | A1 | 10/2010 | Hinton |
| 2013/0159732 | A1* | 6/2013 | Leoutsarakos ...... H04L 63/0435 713/193 |
| 2014/0173284 | A1 | 6/2014 | Ganesan |
| 2014/0270165 | A1* | 9/2014 | Durand ................. H04L 9/0869 380/46 |
| 2015/0271146 | A1* | 9/2015 | Holyfield ............ H04L 63/0428 713/171 |
| 2016/0261576 | A1* | 9/2016 | Nivala .................... H04L 63/08 |

OTHER PUBLICATIONS

Mega Limited, "Mega Sharing," Mega Limited, p. 1, accessed May 28, 2015 at https://mega.co.nz/#help/sharing.

Ipswitch, "MOVEit DMZ Manual v. 7.5," MOVEit DMZ Enterprise, pp. 1-19, accessed May 28, 2015 at https://ftps.nslc.org/doc/en/MOVEitDMZManual.pdf.

Kelly-Yahner, K., "Sending Securely: SendSafely Uses Twilio Two Factor Authentication to Ship Files," Customer Highlights, Twilio Blog, Feb. 3, 2014, pp. 1-3, accessed May 28, 2015 at https://twilio.com/blog/2014/02/send-safely-uses-twilio-two-factor-authentication-nt.html.

* cited by examiner

FIG. 5 ns of the present disclosure may include
MAINTAINING DATA SECURITY IN A NETWORK DEVICE This application claims the benefit of U.S. Provisional Application Ser. No. 62/233,771 filed Sep. 28, 2015, the disclosure of which is incorporated by reference herein in its entirety.

TECHNICAL FIELD

The present disclosure relates generally to maintaining data security in a network device and, more particularly, to systems, methods, and devices for managing encryption keys used for encrypting data securely stored at a network server.

BACKGROUND

The electronic transfer of data has become ubiquitous with the advent of the Internet. Increasingly, users are relying on electronic data transfer for sharing information that is sensitive or confidential in nature. For example, electronic files transferred over a network may contain financial, medical, or technical secrets that, if exposed to the public, to malicious users, or to business competitors, could be disastrous to certain users or businesses. Accordingly, systems, methods, and devices for maintaining data security are highly-desired.

SUMMARY

Embodiments of the present disclosure generally relate to systems, methods, and devices for maintaining data security. According to one or more embodiments, a network device generates different keys, including a secret key, a client key, and a server key. The client and server keys form the secret key when combined. The network device encrypts data received from a sender with the secret key and generates a URL for requesting the data. The URL comprises the client key and a randomly-generated data identifier associated with the data. The network device sends this URL to an electronic address of a recipient. In some embodiments, this allows the recipient to at least partly authenticate themselves by using the URL to request the data. In some embodiments, this additionally or alternatively allows the network device to discard the secret key and client key such that the data can only be decrypted if the recipient requests the data using the URL. For example, the network device may receive the client key in a Hypertext Transfer Protocol (HTTP) request from the recipient, and recreate the secret key by combining the server key with the client key in the received request. The network device may then decrypt the data using the recreated secret key, and send the data to the recipient.

Embodiments of the present disclosure include, for example, a method of maintaining data security, implemented in a network device. The method comprises generating different keys comprising a secret key, a client key, and a server key. The client and server keys form the secret key when combined. The method further comprises encrypting data received from a sender with the secret key, and generating a Uniform Resource Locator (URL) for requesting the data from the network device. The URL comprises the client key and a randomly-generated data identifier associated with the data. The method further comprises sending the URL to an electronic address of a recipient.

Other embodiments of the present disclosure include, for example, a network device. The network device comprises communication circuitry communicatively coupled to processing circuitry. The communication circuitry is configured to exchange signals over the network. The processing circuitry is configured to generate different keys comprising a secret key, a client key, and a server key. The client and server keys form the secret key when combined. The processing circuitry is further configured to encrypt data received from a sender with the secret key. The processing circuitry is further configured to generate a URL for requesting the data from the network device. The URL comprises the client key and a randomly-generated data identifier associated with the data. The processing circuitry is further configured to send the URL to an electronic address of a recipient via the communication circuitry.

Other embodiments of the present disclosure may include a non-transitory computer readable medium for controlling a programmable network device, the computer program product comprising software instructions that, when executed by processing circuitry of the programmable network device, cause the programmable network device to carry out any of the methods described herein.

DETAILED DESCRIPTION

For simplicity and illustrative purposes, the present disclosure is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

As will be further described below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
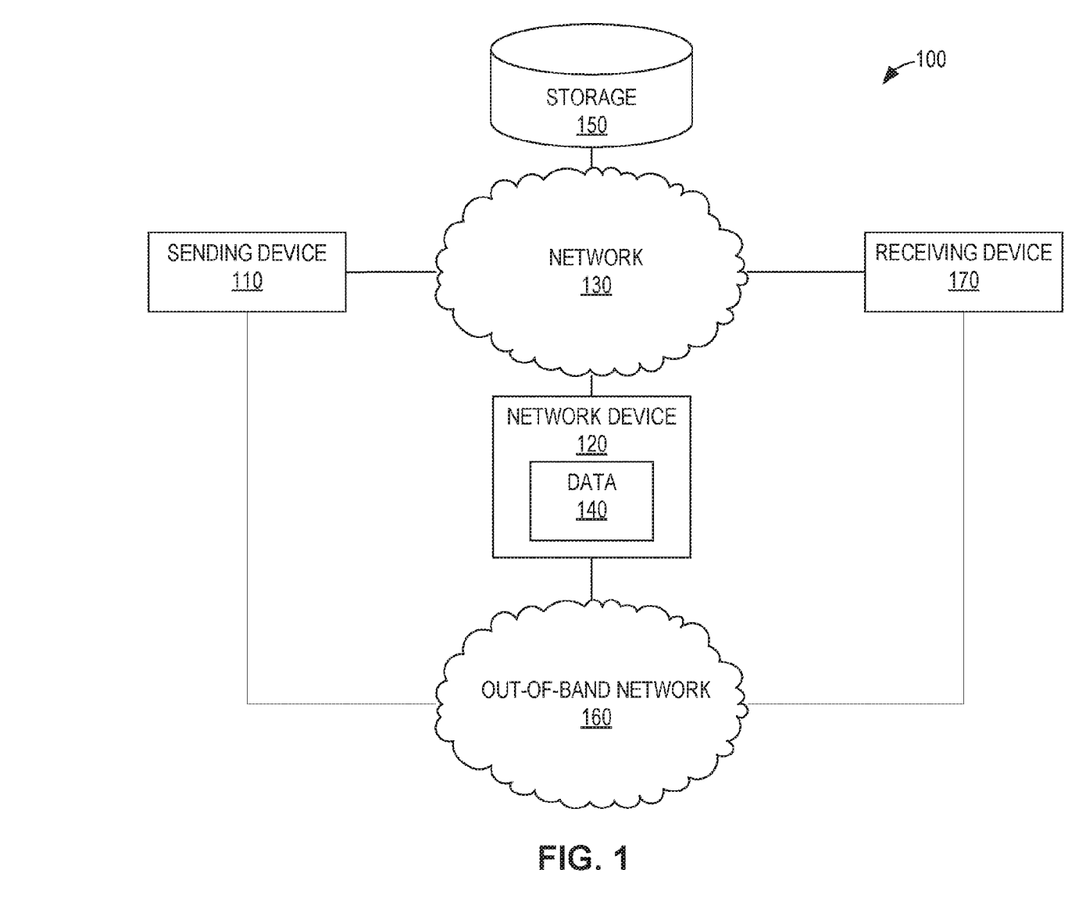
FIG. 1 is a block diagram illustrating an exemplary system in which data security is maintained, according to embodiments.

Referring now to the drawings, FIG. 1 illustrates an exemplary system 100 in which data security is maintained, according to one or more embodiments. The system 100 comprises sending device 110, receiving device 170, storage 150 and network device 120, each of which is connected to a network 130. The network device 120 is also connected to both the sending device 110 and the receiving device 170 via out-of-band network 160. The network 130 and out-of-band network 160 are distinct physical networks which may be entirely or partially disjoint according to particular embodiments.

The network 130 may be any physical network capable of carrying messages between the sending device 110, network device 120, storage 150, and receiving device 170, such as (but not limited to) the Internet, one or more local area networks, one or more wireless networks, one or more cellular networks, one or more Internet Protocol-based networks, one or more Ethernet networks, one or more optical networks, one or more telephone networks, and/or one or more circuit-switched networks.

The out-of-band network 160 may be any physical network distinct from the network 130 that is capable of carrying messages between the network device 120 and receiving device 170, such as (but not limited to) the Internet, one or more local area networks, one or more wireless networks, one or more cellular networks, one or more Internet Protocol-based networks, one or more Ethernet networks, one or more optical networks, one or more telephone networks, and/or one or more circuit-switched networks. Although the example system 100 of FIG. 1 includes an out-of-band network 160, other embodiments may lack an out-of-band network 160.

Storage 150 may comprise any non-volatile physical storage medium capable of storing information received over network 130. Accordingly, storage 150 may, for example, comprise one or more storage area networks (SANs), network attached storage (NAS) servers, Redundant Array of Independent Disks (RAID) arrays, solid state drives, hard disk drives, or any combination thereof. Other forms of non-volatile physical storage mediums may similarly be used to implement storage 150. In some embodiments, storage 150 includes a repository for storing one or more keys used for encryption and/or decryption. Further, although storage 150 is illustrated in FIG. 1 as connected to network device 120 via network 130, according to other embodiments, storage 150 may be comprised within network device 120, either wholly or in part. Alternatively, storage 150 may be attached to network device 120 via a private network, such as an intranet. Thus, network device 120 may generally store information locally and/or remotely, according to embodiments.

Each of the sending and receiving devices 110, 170 may be any device that is capable of sending and/or receiving data 140 (e.g., one or more files and/or text-based messages) over the network 130. In particular, the sending device 110 may be operated by a sender of data 140, and the receiving device 170 may be operated by a recipient of data 140. According to embodiments, each of the sending and receiving devices 110, 170 may be a personal computer, desktop computer, laptop computer, workstation, smartphone, wearable computer, or tablet computer. The network device 120 may be any device that is capable of sending and receiving the data 140 via the network 130 and storing information (e.g., the data 140) in storage 150. For example, the network device 120 may be a network server, mainframe, or server cluster.

In general, the system 100 may be used to send data 140 across the network 130 from sending device 110 to receiving device 170 via network device 120. As will be discussed in further detail below, network device 120 may perform various tasks to ensure that the data 140 is transferred securely. Such tasks may include, for example, various authentication, encryption, and decryption tasks. According to various embodiments, once the network device 120 has received data 140 from sending device 110, the data 140 may be accessed by sending device 110 and/or receiving device 170 via the network device 120, e.g., asynchronously. Although not depicted in FIG. 1, other embodiments may include a plurality of receiving devices 170, any or all of which may retrieve data 140 from the network device 120.

To support the secure transfer of data 140 from sending device 110 to receiving device 170, the network device 120 may generate one or more keys used for encrypting and/or decrypting the data 140. For example, the network device 120 may, in some embodiments, generate a single key for symmetric encryption and decryption of the data 140. As another example, the network device 120 may generate asymmetric keys for encryption and decryption, respectively. Any of such keys may be kept secret. For example, the network device 120 may, in some embodiments, not transmit a particular key over any network 130, 160. In other embodiments, the network device 120 transmits one or more keys over a network 130 for storage in, and later retrieval from, a secure key repository provided by storage 150. In some such embodiments, the one or more keys stored in storage 150 are not transmitted to the sending and receiving devices 110, 170.

In some embodiments, the ability to encrypt and/or decrypt data 140 is tightly-controlled. To improve security with respect to a particular key, the network device 120 may take measures to prevent or limit opportunities for malicious users to gain access to that key. For example, the network device 120 may break the key into pieces (e.g., sub-keys) and store the pieces separately, thereby making it more difficult for a malicious user to obtain the entire key needed for decryption.

Figure 2:
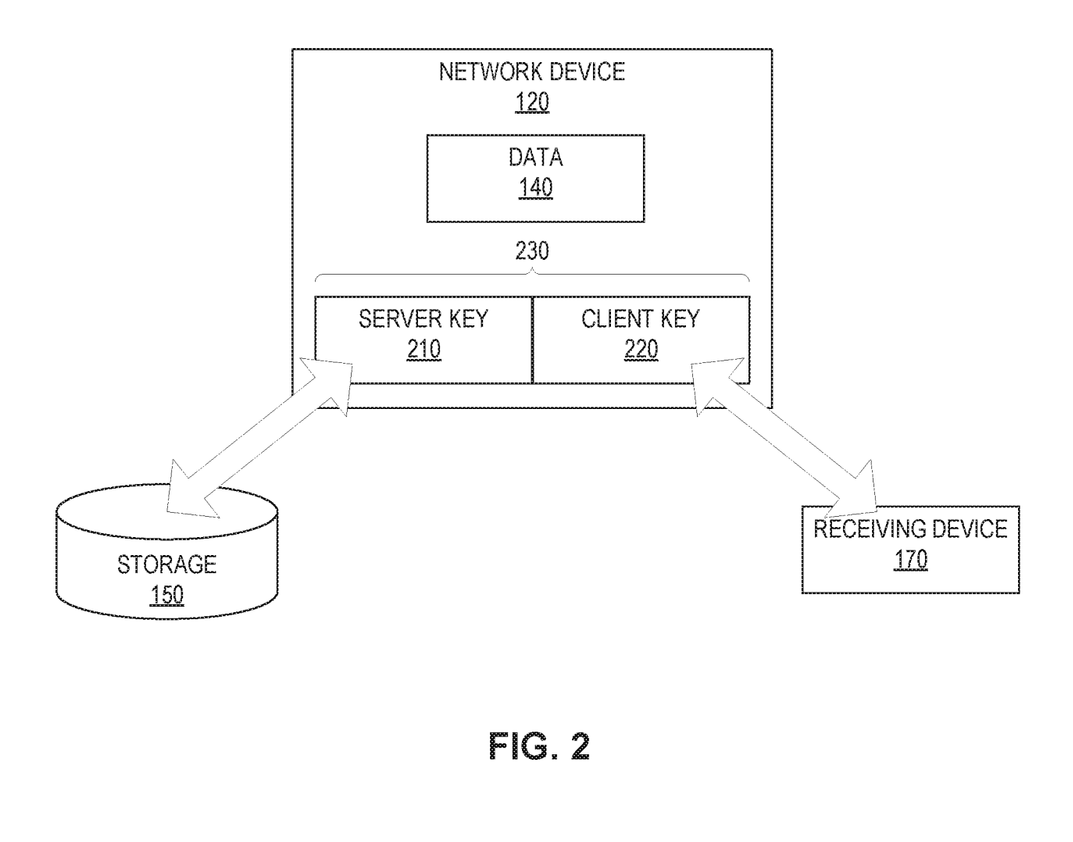
FIG. 2 is a block diagram illustrating key management performed by a network device, according to embodiments.

FIG. 2 illustrates an example of a network device 120 that generates different keys in support of maintaining data security. In particular, the network device generates a server key 210, a client key 220, and a secret key 230. The server key 210 and client key 220 form the secret key 230 when combined. The network device 120 stores the server key 210, but not the client key 220, in storage 150. The network device 120 sends the client key 220 to the receiving device 170 (and in some embodiments, also to the sending device 110, not shown in FIG. 2). Although the receiving device 170 may not have access to the server key 210 (or storage 150, in some embodiments), the receiving device 170 may be able to request the data 140 from the network device 120 by sending the client key 220 back to the network device 120. This may, for example, enable the network device 120 to recreate the secret key 230 using both the server and client keys 210, 220. The network device 120 may then use the recreated secret key 230 to decrypt the data 140 before sending the data 140 to the receiving device 170. In contrast, an unauthorized user that does not have the client key 220 may be unable to provide the network device 120 with enough information to recreate the secret key 230, and consequently will not be able to properly request the data 140 from the network device 120.

In some embodiments, the network device 120 generates the secret key 230, and then uses the secret key 230 to generate the server and client keys 210, 220. For example, the network device 120 may select respective parts from the secret key 230 to be the server and client keys 210, 220, as shown in FIG. 2. Alternatively, the network device 120 may generate the server and client keys 210, 220 and then generate the secret key 230 by combining the server and client keys 210, 220. Various embodiments include combining the server and client keys 210, 220 in a variety of ways, some of which may be quite complex. For example, the server and client keys 210, 220 may be combined by interleaving the server and client keys 210, 220, and/or by combining the server and client keys 210, 220 according to a mathematical algorithm, for example. In such embodiments, selecting parts from the secret key 230 to produce the server and client keys 210, 220 may include a corresponding reversal of the measures taken to combine the server and client keys 210, 220.

In some embodiments, the network device 120 supports operating in both single key and multiple key modes. For example, the network device 120 may generate the secret key 230, and encrypt the data 140 using the secret key 230. The network device 120 may then receive an instruction to take further steps to protect the secret key 230. For example, the network device 120 may receive an instruction to discard the secret key 230 from the sender or recipient. Accordingly, responsive to the instruction, the network device 120 may generate the server and client keys 210, 220 from the secret key 230, and send the server and client keys 210, 220 to storage 150 and the receiving device 170, respectively. The network device 120 may further discard one or both of the secret key 230 and the client key 220 in response.

In some embodiments, the client key 220 may be sent to the receiving device 170 as part of a URL, e.g., by sending the URL to an electronic address of the recipient. Such an electronic address may be an email address, phone number, username, profile identifier, or other address to which electronic messages may be delivered. Accordingly, the URL may be sent and/or delivered to the recipient via email, Short Message Service (SMS), Multimedia Messaging Service (MMS), and/or instant message, for example. Once received by the receiving device 170, a recipient may use the URL to request the data 140. For example, clicking on the URL may cause the receiving device 170 to transmit a Hypertext Transport Protocol (HTTP) request for the data 140 to the network device 120.

The URL may indicate one or more appropriate protocols to be used for requesting the data 140, the hostname of the network device 120, the domain name of the network device 120, the path to the directory where the data 140 to be transferred is stored, and the client key 220. In some embodiments, the URL may also include a recipient identifier corresponding to the recipient. For example, the URL may be in the format: <protocol>://<hostname>.<domain name><path>?key=<client key>&r=<recipient id>. In such an example, a protocol of Secure Hypertext Transfer Protocol (HTTPS), a hostname of "drop", a domain of "example.com," a path of "123," a client key 220 of "ABC," and a recipient identifier of XYZ may result in a URL of "https://drop.example.com/123/?key=ABC&r=XYZ".

Some embodiments may include a data identifier associated with the data in the URL. This data identifier may also take a variety of different forms, according to respective embodiments. In some embodiments, the data identifier is randomly generated by the network device 120. In other embodiments, the data identifier is an identifier received from the sending device. In some embodiments, the network device 120 creates a directory structure in storage 150 such that the data identifier is included in the URL as the above-discussed path. Other embodiments include the data identifier as a name/value pair in the query section of the URL (i.e., after the question mark).

The recipient identifier may also take a variety of different forms, according to respective embodiments. In some embodiments, the recipient identifier is an electronic address of the recipient. In other embodiments, the network device 120 randomly generates the recipient identifier and associates the recipient identifier with the recipient. In yet other embodiments, the recipient identifier is a value provided by the sending device 110. Other values of the recipient identifier are used in other embodiments.

For some embodiments in which the data 140 is sent to a plurality of different recipients, the network device 120 may generate different URLs for the respective recipients. In particular, the different URLs may include the same client key 220 but different recipient identifiers. The different URLs may also include the same data identifier, according to embodiments. The different URLs, once generated, may be sent to different electronic addresses, each corresponding to a different recipient.

One or more recipients may request the data 140 using a URL as described above. The request may include the client key 220 and the data identifier in that URL. The request may also include a recipient identifier, e.g., if one was included in the URL. The network device 120, having received the request, may retrieve the one or more keys that were stored in storage 150 (e.g., the server key 210). If the client key 220 in the request is valid, the network device may recreate the secret key 230 using the server key 210 retrieved from storage 150 and the client key 220 received from the receiving device 170, according to embodiments. In particular, the network device 120 may combine the server and client keys 210, 220 as described above. The network device 120 may then decrypt the data 140 using the recreated secret key 230 and send the data 140 to the receiving device 170. However, if the client key 220 in the request is invalid or missing (e.g., a hacker uses a fake key, incorrectly guesses at the client key 220, or omits the client key 220 entirely), the network device 120 will not be able to recreate the secret key 230 correctly (or at all), and the decryption process will be unsuccessful (e.g., the data 140 will be garbled or remain encrypted).

In some embodiments, the network device 120 may take additional measures to authenticate the recipient that is requesting the data 140. For example, the network device 120 may require that the recipient demonstrate and/or confirm access to one or more electronic messaging accounts before sending the data 140. In particular, in response to receiving the request for the data 140 from the recipient, the network device 120 may, in some embodiments, send an authentication code to the recipient and refrain from decrypting and/or sending the data 140 to the recipient until receiving the authentication code from the recipient in response. In some such embodiments, the network device 120 may send this authentication code to the same electronic address to which it sent the URL for that recipient (e.g., thereby requesting that the recipient to demonstrate continued access to the same account). Alternatively, the network device 120 may send the authentication code to a different electronic address (e.g., thereby requesting the recipient to demonstrate access to more than one of the recipient's accounts). For example, the network device 120 may send the URL in an email using the recipient's email address and send the authentication code in an SMS using the recipient's cell phone number. Upon receiving the authentication code from the recipient, the network device 120 may conclude the recipient, and not an unauthorized person (e.g., a hacker), is requesting the data 140.

As a further measure to protect against malicious user, the network device 120 may in some embodiments, send the URL to the recipient using the network 130 and send the authentication code to the recipient using the out-of-band network 160. By sending the authentication code to recipient via a different route, the network device 120 may be able to prevent a middleman from intercepting the authentication code in transit. Further, if the recipient receives the authentication code without having requested the data 140, the recipient may recognize that an unauthorized party is attempting to access the data 140. Although the URL and authentication code may be sent via different networks 130, 160, the authentication code and URL may be received by the recipient at the same receiving device 170 (e.g., a smartphone with both email and SMS capabilities).

As a yet further measure against malicious users, the network device 120 may allow the recipient a threshold period of time and/or number of authentication attempts to respond with the correct authentication code. In such embodiments, the network device 120 may send the data 140 to the recipient in response to receiving the correct authentication code within the threshold period of time and/or number of authentication attempts and/or refrain from sending the data 140 to the recipient otherwise.

The above has discussed various embodiments in which data 140 is encrypted, decrypted, and sent to one or more recipients. The network device 120, in some embodiments, may also support sending further data that is associated with data 140. For example, aspects of the above may be applied in order to enable the recipient to send further data, separately from data 140, back to the sender and/or to other recipients via the network device 120. In such examples, the network device 120 may keep track of the transactions in which the sender and recipient(s) exchange messages, encrypting the files and/or text-messages including therein as described above.

Thus, further data may be received by the network device 120 separately from the data 140. Similarly to data 140, this further data may also comprise one or more files and/or one or more text-based messages. This further data may be received from the sender or any recipient, according to embodiments.

The network device 120 may encrypt this further data using the same secret key 230 described above. In particular, the network device 120 may use the secret key 230 for any or all of the transactions exchanged between the sender and recipient(s) that are associated with data 140. For example, the sender may send a contract to a recipient via the network server, and the recipient may respond to that contract with a revised contract or an instruction to sign the sender's contract. The contract in this example is part of an electronic conversation being held between the sender and recipient that includes the exchange of one or more files and/or text-based messages. The network device 120 may use the server, client, and secret keys 210, 220, 230 to encrypt any or all of the files and/or messages exchanged as part of this conversation. Further, in some embodiments, the network device 120 may switch between single key and multiple key modes, as described above, one or more times over the course of the conversation.

Figure 3:
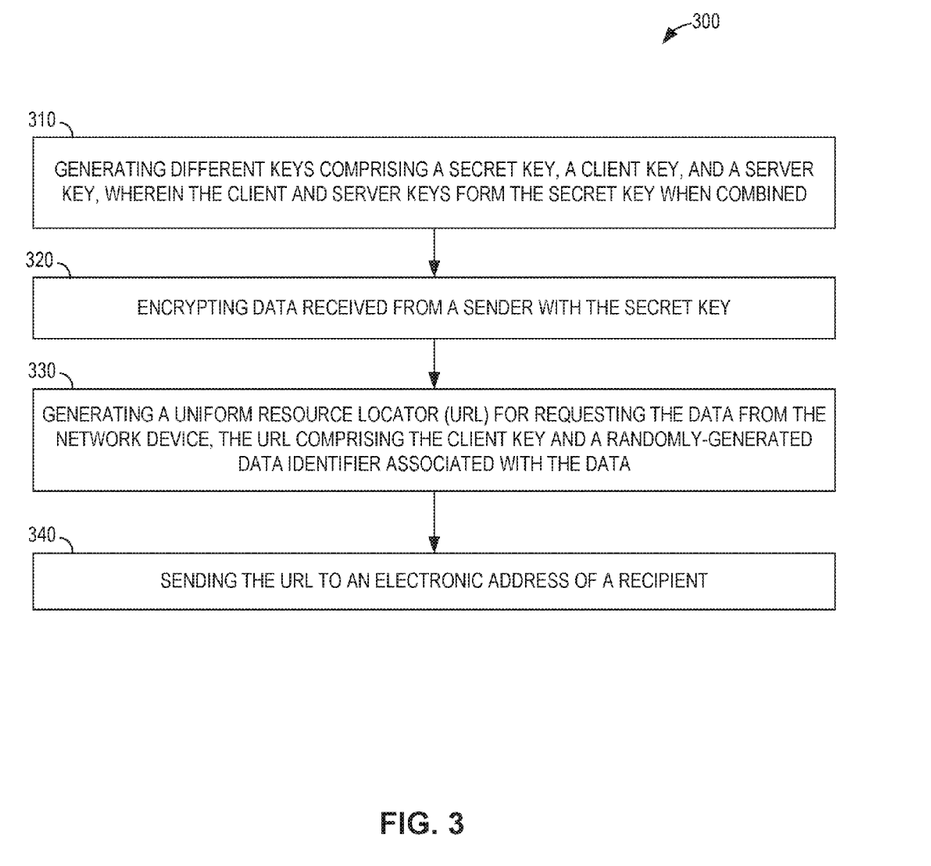
FIG. 3 is a flow diagram illustrating an example method of maintaining data security, implemented by a network device, according to embodiments.

In view of the above, FIG. 3 illustrates an example method 300 of maintaining data security, implemented in a network device 120. The method 300 comprises generating different keys comprising a secret key 230, a client key 220, and a server key 210 (block 310). The client and server keys 220, 210 form the secret key 230 when combined. The method 300 further comprises encrypting data 140 received from a sender with the secret key 230 (block 320), and generating a Uniform Resource Locator (URL) for requesting the data 140 from the network device 120 (block 330). The URL comprises the client key 220 and a randomly-generated data identifier associated with the data 140. The method 300 further comprises sending the URL to an electronic address of a recipient (block 340).

Figure 4:
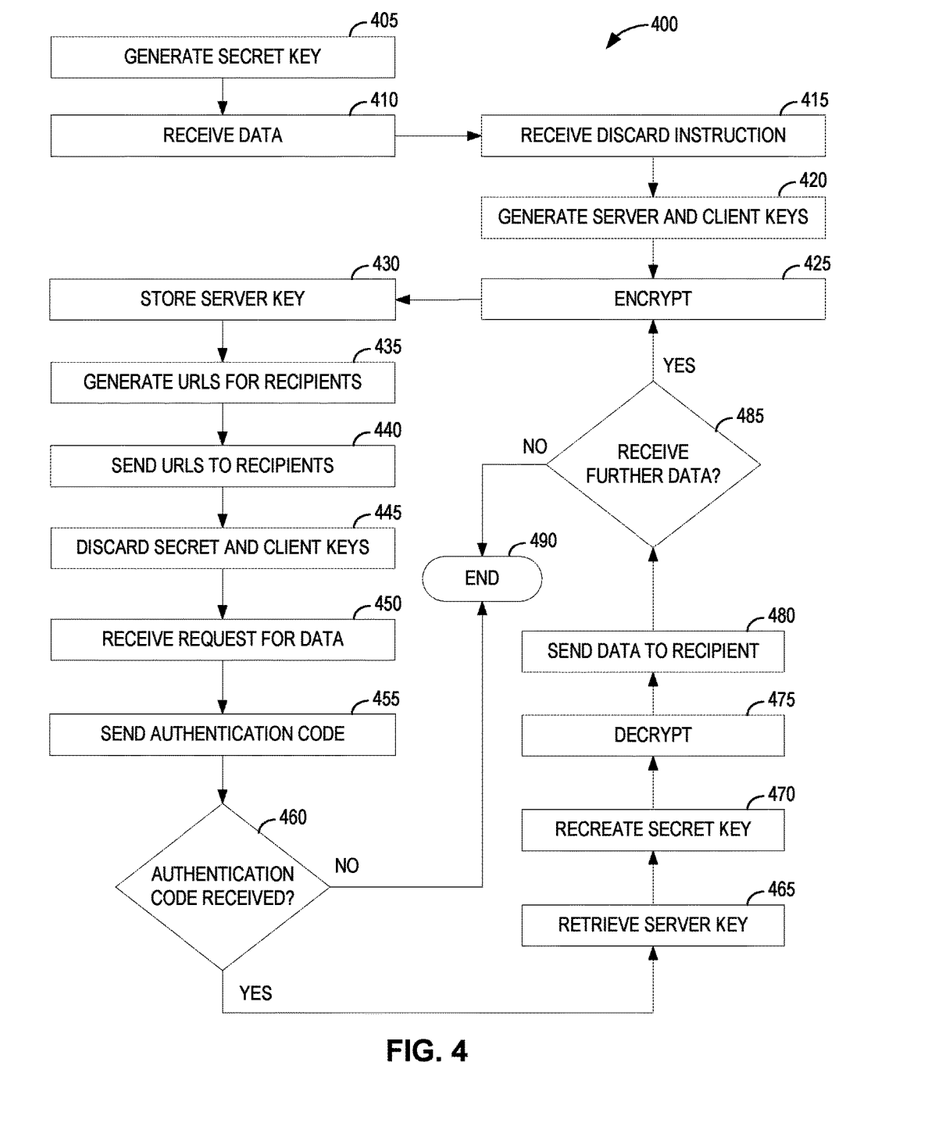
FIG. 4 is a flow diagram illustrating another example method of maintaining data security, implemented by a network device, according to embodiments.

FIG. 4 illustrates another example method 400 of maintaining data security, implemented in a network device 120. The method 400 comprises generating a secret key 230 that is useful for encrypting and decrypting, e.g., for a particular sender or electronic conversation that will take (or is taking) place between a sender and recipient (block 405). The network device 120 receives, over the network 130, data 140 (block 410) and an instruction informing the network device 120 to discard the secret key 230, e.g., to protect the secret key 230 from being stolen by an unauthorized party (block 415). In response, the network device 120 generates server and client keys 210, 220, e.g., by selecting respective parts from the secret key 230 as discussed above (block 420). The network device 120 further encrypts the data 140 using the secret key 230 (block 425).

The network device 120 stores the server key 210, e.g., in a key storage repository provided by storage 150 (block 430). The network device 120 further generates different URLs for different recipients (block 435). In this example, the different URLs each include a data identifier associated with data 140, the client key 220, and a corresponding recipient identifier associated with the recipient to whom the URL will be sent. The network device 120 sends the URLs to electronic addresses of the respective recipients (block 440), and discards the secret and client keys 230, 220, e.g., in accordance with the discard instruction and to prevent the secret key 230 from being stolen (and/or recreated without the client key 220) (block 445).

The network device 120 subsequently receives a request for the data 140 from a responding recipient (block 450). In this example, the request includes the client key 220, the data identifier, and the responding recipient's corresponding recipient identifier. In response to receiving the request, the network server 120 sends an authentication code to a different electronic address of the responding recipient via the out-of-band network 160.

The network device 120 then determines whether the authentication code is received from the recipient, e.g., within a threshold period of time and within a threshold number of attempts (block 460). If not (block 460, no), the method ends (block 490). Otherwise (block 460, yes), the network server 120 retrieves the server key 210 (block 465) and uses the server key 210 and client key 220 from the responding recipient's request to recreate the secret key 230 (block 470). The network device 120 then decrypts the data 140 using the secret key 230 (block 475) and sends the data 140 to the recipient via the network 130 (block 480).

The network device 120 determines whether it receives further data, associated with data 140, from the sender or any of the recipients (block 485). If such further data is not received (block 485, no), the method 400 ends (block 490). If such further data is received (block 485, yes), the network device 120 encrypts the further data using the recreated secret key 230 (block 425) and proceeds as described above using the further data. In this example, further one or more files and/or text-based messages may be added to a conversation between the sender and recipients until no further files and/or text-based messages are exchanged.

Figure 5:
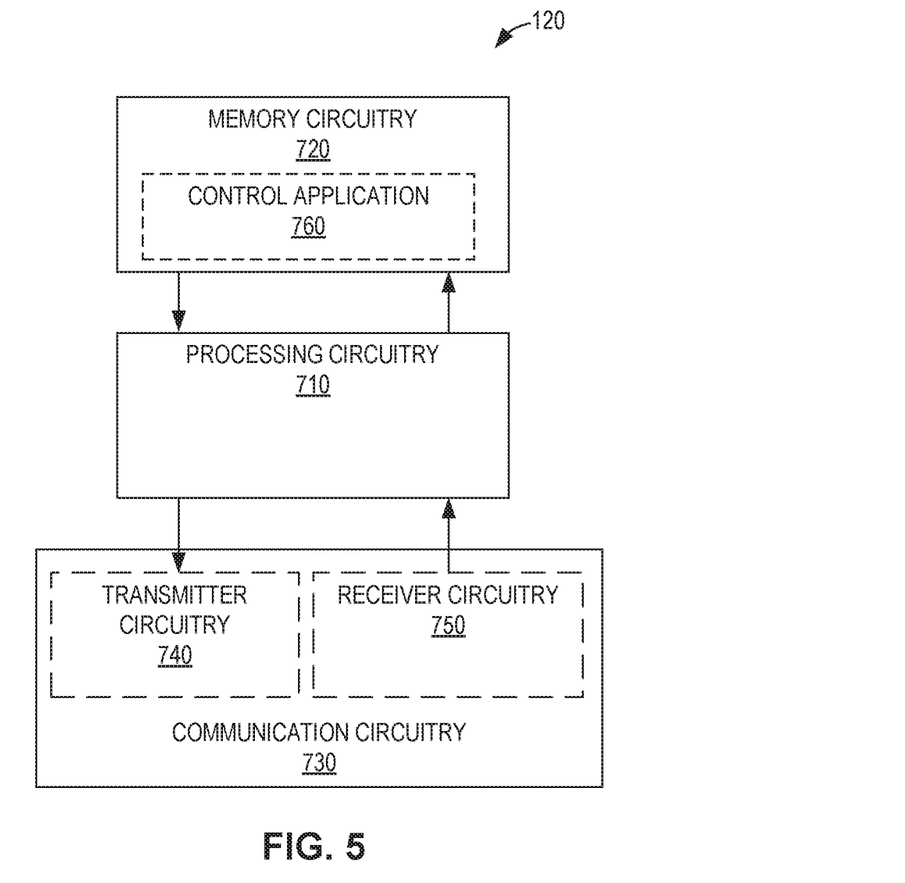
FIG. 5 is a block diagram illustrating exemplary hardware of a network device, according to embodiments.

The network device 120 may be implemented according to the example hardware illustrated in FIG. 5. The example hardware of FIG. 5 comprises processing circuitry 710, memory circuitry 720, and communication circuitry 730. The processing circuitry 710 is communicatively coupled to the memory circuitry 720 and communication circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing machine instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The communication circuitry 730 may be configured to exchange signals over a network 130, such as a cellular network, Ethernet network, or optical network. The communication circuitry 730 may also be configured to exchange signals over an out-of-band network 160, as discussed above. For example, the communication circuitry 730 may include a transceiver. According to embodiments, the communication circuitry 730 may comprise distinct transmitter circuitry 740 and receiver circuitry 750. The transmitter circuitry 740 may be configured to send communication signals over the communications network 130, whereas the receiver circuitry 750 may be configured to receive communication signals over the communications network 130. Thus, the communication circuitry 730 may be implemented as a unitary physical component, or as a plurality of physical components that may be contiguously or separately arranged, any of which may be communicatively coupled to any other, or may communicate with any other via the processing circuitry 710.

The processing circuitry 710 may be configured to generate different keys comprising a secret key 230, a client key 220, and a server key 210, wherein the client and server keys 220, 210 form the secret key 230 when combined. The processing circuitry 710 may be further configured to encrypt data 140 received from a sender with the secret key 230, and generate a URL for requesting the data 140 from the network device 120. The URL comprises the client key 220 and a randomly-generated data identifier associated with the data 140. The processing circuitry 710 is further configured to send the URL to an electronic address of a recipient.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of that which is claimed are intended to be embraced therein.

What is claimed is:

1. A method of maintaining data security, implemented in a network device, the method comprising:
   generating different keys comprising a secret key, a client key, and a server key, wherein the client and server keys form the secret key when combined;
   encrypting data received from a sender with the secret key;
   generating a Uniform Resource Locator (URL) for requesting the data from the network device, the URL comprising the client key and a randomly-generated data identifier associated with the data;
   sending the URL to an electronic address of a recipient.

2. The method of claim 1, further comprising:
   receiving a request comprising the client key and data identifier from the recipient;
   recreating the secret key by combining the server key with the client key from the received request;
   decrypting the data using the recreated secret key;
   sending the data to the recipient responsive to decrypting the data using the recreated secret key.

3. The method of claim 2, further comprising discarding the recreated secret key responsive to decrypting the data using the recreated secret key.

4. The method of claim 2, further comprising:
   receiving further data from the sender or recipient, wherein the further data is associated with, and received separately from, the data received from the sender;
   encrypting the further data with the recreated secret key.

5. The method of claim 2, wherein recreating the secret key is responsive to:
   sending an authentication code to the recipient; and
   receiving the authentication code from the recipient within a threshold period of time allowed to the recipient for authenticating.

6. The method of claim 5, wherein recreating the secret key is further responsive to receiving the authentication code from the recipient within a threshold number of authentication attempts allowed to the recipient for authenticating.

7. The method of claim 1, wherein the data comprises a file and a separate text-based message.

8. The method of claim 1, wherein generating the different keys is responsive to receiving the data from the sender.

9. The method of claim 1, further comprising storing one or more of the different keys in, and retrieving the one or more of the different keys from, a key storage repository.

10. The method of claim 1, wherein the URL further comprises a randomly-generated recipient identifier associated with the recipient, the method further comprising;
    generating a different URL, the different URL comprising the data identifier, the client key, and a different randomly-generated recipient identifier associated with a different recipient;
    sending the further URL to an electronic address of the different recipient.

11. The method of claim 1, wherein generating the secret key comprises combining the client and server keys.

12. The method of claim 1, wherein generating the client and server keys comprises selecting respective parts from the secret key as the client and server keys.

13. The method of claim 12, wherein generating the client and server keys is responsive to receiving an instruction informing the network device to discard the secret key.

14. The method of claim 1, further comprising discarding:
the secret key responsive to encrypting the data; and
the client key responsive to sending the URL.

15. A network device comprising:
communication circuitry configured to exchange signals over a network;
processing circuitry communicatively coupled to the communication circuitry and configured to:
generate different keys comprising a secret key, a client key, and a server key, wherein the client and server keys form the secret key when combined;
encrypt data received from a sender with the secret key;
generate a Uniform Resource Locator (URL) for requesting the data from the network device, the URL comprising the client key and a randomly-generated data identifier associated with the data;
send the URL to an electronic address of a recipient via the communication circuitry.

16. The network device of claim 15, wherein the processing circuitry is further configured to:
receive a request comprising the client key and data identifier from the recipient;
recreate the secret key by combining the server key with the client key from the received request;
decrypt the data using the recreated secret key;
send the data to the recipient responsive to decrypting the data using the recreated secret key.

17. The network device of claim 16, wherein the processing circuitry is further configured to discard the recreated secret key responsive to decrypting the data using the recreated secret key.

18. The network device of claim 16, wherein the processing circuitry is further configured to:
receive further data from the sender or recipient, wherein the further data is associated with, and received separately from, the data received from the sender;
encrypt the further data with the recreated secret key.

19. The network device of claim 16, wherein the processing circuitry is configured to recreate the secret key responsive to:
sending an authentication code to the recipient; and
receiving the authentication code from the recipient within a threshold period of time allowed to the recipient for authenticating.

20. The network device of claim 19, wherein the processing circuitry is configured to recreate the secret key further responsive to receiving the authentication code from the recipient within a threshold number of authentication attempts allowed to the recipient for authenticating.

21. The network device of claim 15, wherein the data comprises a file and a separate text-based message.

22. The network device of claim 15, wherein the processing circuitry is configured to generate the different keys responsive to receiving the data from the sender.

23. The network device of claim 15, wherein the processing circuitry is further configured to store one or more of the different keys in, and retrieving the one or more of the different keys from, a key storage repository.

24. The network device of claim 15, wherein the URL further comprises a randomly-generated recipient identifier associated with the recipient, and the processing circuitry is further configured to:
generate a different URL, the different URL comprising the data identifier, the client key, and a different randomly-generated recipient identifier associated with a different recipient;
send the further URL to an electronic address of the different recipient.

25. The network device of claim 15, wherein to generate the secret key, the processing circuitry is configured to combine the client and server keys.

26. The network device of claim 15, wherein to generate the client and server keys, the processing circuitry is configured to select respective parts from the secret key as the client and server keys.

27. The network device of claim 26, wherein the processing circuitry is configured to generate the client and server keys responsive to receiving an instruction informing the network device to discard the secret key.

28. The network device of claim 15, wherein the processing circuitry is further configured to discard:
the secret key responsive to encrypting the data; and
the client key responsive to sending the URL.

29. A non-transitory computer readable medium storing a computer program product for controlling a programmable network device, the computer program product comprising software instructions that, when executed by processing circuitry of the programmable network device, cause the programmable network device to:
generate different keys comprising a secret key, a client key, and a server key, wherein the client and server keys form the secret key when combined;
encrypt data received from a sender with the secret key;
generate a Uniform Resource Locator (URL) for requesting the data from the network device, the URL comprising the client key and a randomly-generated data identifier associated with the data;
send the URL to an electronic address of a recipient.

* * * * *